(12) United States Patent
Nespor

(10) Patent No.: US 11,247,600 B2
(45) Date of Patent: *Feb. 15, 2022

(54) CARRIER WITH SLIDABLE BED AND ZERO-DEGREE LOAD ANGLE

(71) Applicant: Miller Industries Towing Equipment, Inc., Ooltewah, TN (US)

(72) Inventor: Ronald B. Nespor, Greenville, PA (US)

(73) Assignee: Miller Industries Towing Equipment, Inc., Ooltewah, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/037,947

(22) Filed: Sep. 30, 2020

(65) Prior Publication Data

US 2021/0009025 A1 Jan. 14, 2021

Related U.S. Application Data

(63) Continuation of application No. 16/410,661, filed on May 13, 2019, now Pat. No. 10,829,027.

(51) Int. Cl.
*B60P 3/06* (2006.01)
*B60P 1/30* (2006.01)

(52) U.S. Cl.
CPC .. *B60P 3/06* (2013.01); *B60P 1/30* (2013.01)

(58) Field of Classification Search
CPC .. B60P 3/06; B60P 3/062; B60P 3/064; B60P 3/07; B60P 3/122; B60P 1/30; B60P 1/045; B60P 1/06; B60P 1/12; B60P 1/16; B60P 1/20; B60P 1/64; B60P 1/6418; B60P 1/6454; B60P 1/433; B60P 1/649; B60P 1/6409
See application file for complete search history.

(56) References Cited

U.S. PATENT DOCUMENTS

| | | | | |
|---|---|---|---|---|
| 3,376,987 | A * | 4/1968 | Lohse | A01D 90/08 |
| | | | | 414/477 |
| 3,485,400 | A * | 12/1969 | Pewthers | B60P 1/6454 |
| | | | | 414/477 |
| 4,368,002 | A | 1/1983 | Krzyzosiak | |
| 8,070,411 | B2 | 12/2011 | Jaeger | |
| 9,656,587 | B2 * | 5/2017 | Mullin | B60P 1/32 |
| 2013/0149084 | A1 * | 6/2013 | Jaeger | B60P 1/04 |
| | | | | 414/477 |
| 2017/0036588 | A1 * | 2/2017 | Nicolas Gil | B60P 1/433 |
| 2017/0057392 | A1 * | 3/2017 | Killgour | B60P 3/122 |
| 2019/0351801 | A1 * | 11/2019 | Rousselle | B62D 63/08 |

* cited by examiner

*Primary Examiner* — Glenn F Myers
(74) *Attorney, Agent, or Firm* — Michael P. Mazza; Michael P. Mazza, LLC

(57) ABSTRACT

A vehicle carrier mountable to a vehicle frame, and a method for using same, including a tiltable subframe pivotally attached to a rear end of the vehicle frame, and a slidable bed with a transverse hinge mounted on and slidably attached to the subframe. The subframe is tiltable, enabling a rear portion of the bed to lay generally horizontally flat along the ground, and thereby provide an essentially zero-degree loading angle for a vehicle to be transported, while the front portion of the bed remains slidably attached to the inclined subframe.

14 Claims, 20 Drawing Sheets

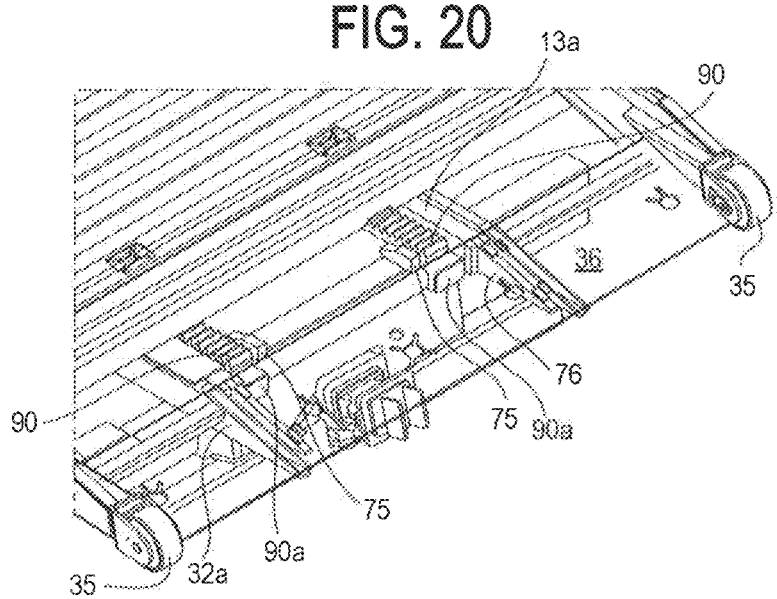
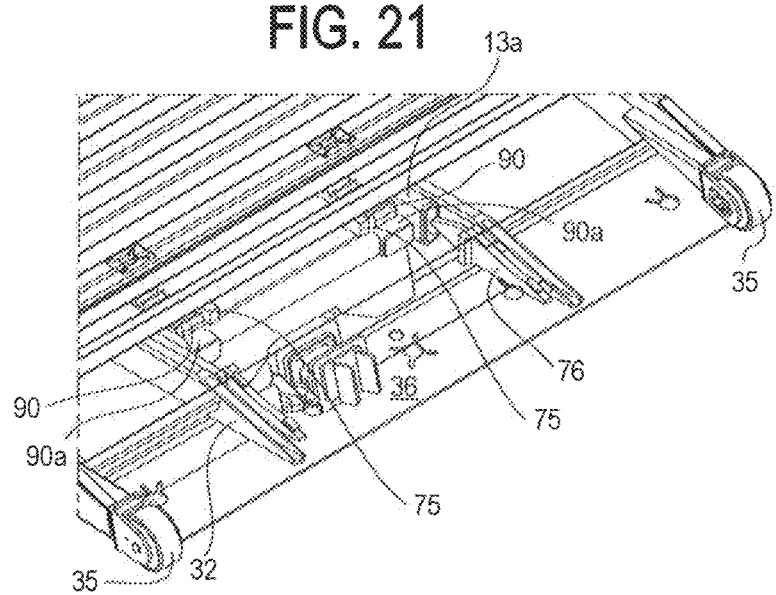

CARRIER WITH SLIDABLE BED AND ZERO-DEGREE LOAD ANGLE

BACKGROUND OF THE INVENTION

The present invention generally relates to vehicle carriers with slidable beds.

Slideback carrier vehicles with tiltable subframes and slidable beds are known. Vehicle carriers with tiltable subframes and roll-off dumpsters or flat beds are also known. Slideback carriers typically have their cargo loaded onto the bed at an inclined angle relative to the ground. Slideback carriers have positive hydraulic control to move the bed forward and rearward along the subframe. Roll-off carriers are designed to enable their bed to lay flat on the ground for the cargo to be loaded. Roll-off carriers get their bed to the ground, and separated ("rolled-off") from the subframe, by using a highly inclined subframe that enables the bed to slide down and off the subframe due to gravity. Getting the roll-off bed back onto the subframe is accomplished by attaching a cable and hook to the front of the bed and reeling the cable in by means of either a forward winch mounted to the front of the subframe, or by means of hydraulic cylinders and pulleys attached to the subframe. If the roll-off flatbed is not equipped with rear rollers for rolling along the ground, the carrier vehicle with its inclined subframe must be driven in reverse under the front of the flat bed simultaneously with the cable being reeled in. This method of operation requires a good deal of skill to prevent the cable from getting slack and sagging onto the subframe into places where it can get caught.

Securing cargo to a bed that is low to the ground or (preferably) is horizontal and flat on the ground, is an advantage for the operator who needs to climb on and off the bed. However, a bed that lays flat on the ground occupies a large foot print on the ground, which may not always be available. The traditional slideback carrier occupies a smaller foot print on the ground because the bed does not travel as far off the subframe. Each style of carrier has its advantages and disadvantages.

It would be advantageous to provide a vehicle carrier that enables the bed to lay flat on the ground while maintaining an engaged connection between the bed and an inclined subframe, and that also has controlled hydraulic power to move the bed both rearward and forward along the subframe without using a cable. In that way, the vehicle carrier could have the benefits of both a traditional slideback vehicle carrier with slidable bed that typically loads at an incline, and a roll-off style vehicle carrier that enables the bed to lay flat on the ground for loading.

SUMMARY OF THE INVENTION

The objects mentioned above, as well as other objects, are solved by the present invention, which overcomes disadvantages of prior vehicle carriers with slidable beds, while providing new advantages not previously associated with such carriers. This summary is provided to introduce a selection of concepts in a simplified form that are further described below in the Detailed Description, so that the claimed invention may be better understood. However, this summary is not intended to limit the scope of the claimed subject matter.

In a preferred embodiment of the present invention, a vehicle carrier is mountable to a vehicle frame. A tiltable subframe is pivotally attached to a rear end of the vehicle frame. The subframe preferably includes two parallel, longitudinal slide rails. A slidable bed is mounted on the subframe. The bed preferably includes two parallel channels each located and sized to slidably attach to one of the longitudinal slide rails of the subframe. The bed also includes a transverse hinge dividing the bed into a relatively short front portion and a relatively long rear portion. Preferably, the subframe is capable of tilting to a sufficient inclination relative to ground to enable the rear portion of the bed to lay generally horizontally flat along the ground, while the front portion of the bed remains slidably attached or engaged to the inclined subframe. Preferably, a substantially zero-degree loading angle is provided for the vehicle to be transported, while the front portion of the bed remains slidably attached to the subframe.

In a particularly preferred embodiment, one or more hydraulic tilt cylinders are pivotally attached at an upper end to the subframe, and at a lower end to vehicle frame brackets located between a cab of the vehicle, and rear axles of the vehicle. The rear portion of the bed preferably includes rear rollers for rolling the rear end of the bed along the ground.

In one preferred embodiment, the subframe includes longitudinal gear racks located inboard of and parallel to the slide rails of the subframe. The front portion of the bed may carry a pair of symmetrically-aligned, motor-driven gear boxes axially aligned and coupled to a drive axle oriented axially parallel to the transverse hinge of the bed. The drive axle may include a pair of gears engaging the longitudinal gear racks of the subframe to cause the bed to move forward and rearward relative to the subframe. Hydraulic pressure may be applied to the motor-driven gear boxes to cause the bed to travel longitudinally along the subframe.

In another preferred embodiment of the present invention, a method is provided for using a vehicle carrier mountable to a vehicle frame. A tiltable subframe is provided which is pivotally attached to a rear end of the vehicle frame. The subframe may include two parallel, longitudinal slide rails. A slidable bed is mounted on the subframe. The bed may include two parallel channels each located and sized to slidably attach to one of the longitudinal slide rails of the subframe. The bed may also include a transverse hinge dividing the bed into a relatively short front portion and a relatively long rear portion. The bed may be moved in a rearward direction relative to the subframe, and the subframe may be tilted to a sufficient inclination relative to ground to enable the rear portion of the bed to lay generally horizontally flat along the ground, and thereby provide essentially a zero-degree loading angle for a vehicle to be transported, while the front portion of the bed remains slidably attached to the inclined subframe. Preferably, the step of tilting the subframe includes the step of locating the vehicle to be transported at a substantially zero-degree loading angle while the front portion of the bed remains slidably attached to the subframe.

To move the vehicle to be transported to a loaded and stowed position, the bed may be moved in a forward direction up the inclined subframe, and the subframe may again be tilted to bring the subframe to a position generally parallel to the vehicle frame, while the front portion of the bed remains slidably attached to the subframe.

DEFINITION OF CLAIM TERMS

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

The "transverse hinge" of the bed may include one or more hinges, preferably axially aligned and parallel with the drive axle, and enabling two portions of the bed to pivot about the hinge(s). If the bed only includes a single pivot pin with bushings in continuous fashion (similar to a piano hinge), this may still make up such a "transverse hinge."

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIGS. 20-21 are partial, enlarged side and front perspective view of the rear of the bed, illustrating how the rear lock plates form a hard stop against the back of the subframe to limit the bed's forward travel.

The components in the drawings are not necessarily to scale, emphasis instead being placed upon clearly illustrating the principles of the present invention. In the drawings, like reference numerals designate corresponding parts throughout the several views.

Figure 1:
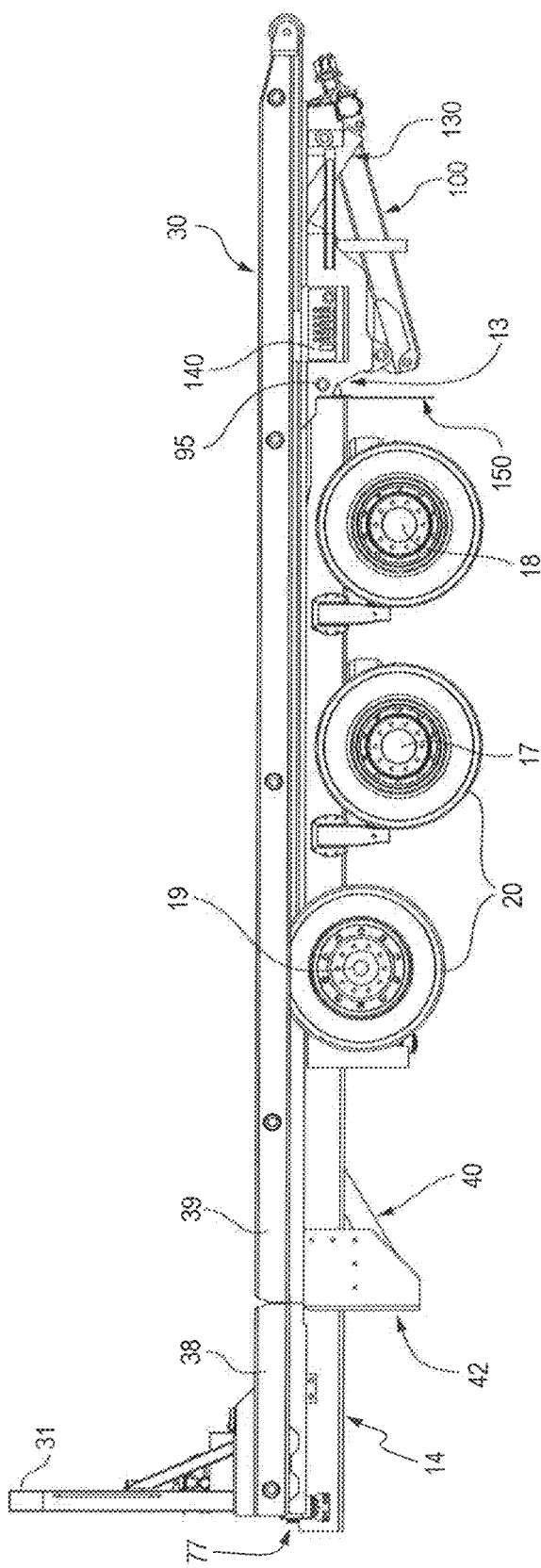
FIG. 1 is a side perspective view of a preferred embodiment of a rear portion of the vehicle carrier with slidable bed according to the present invention.
Figure 2:
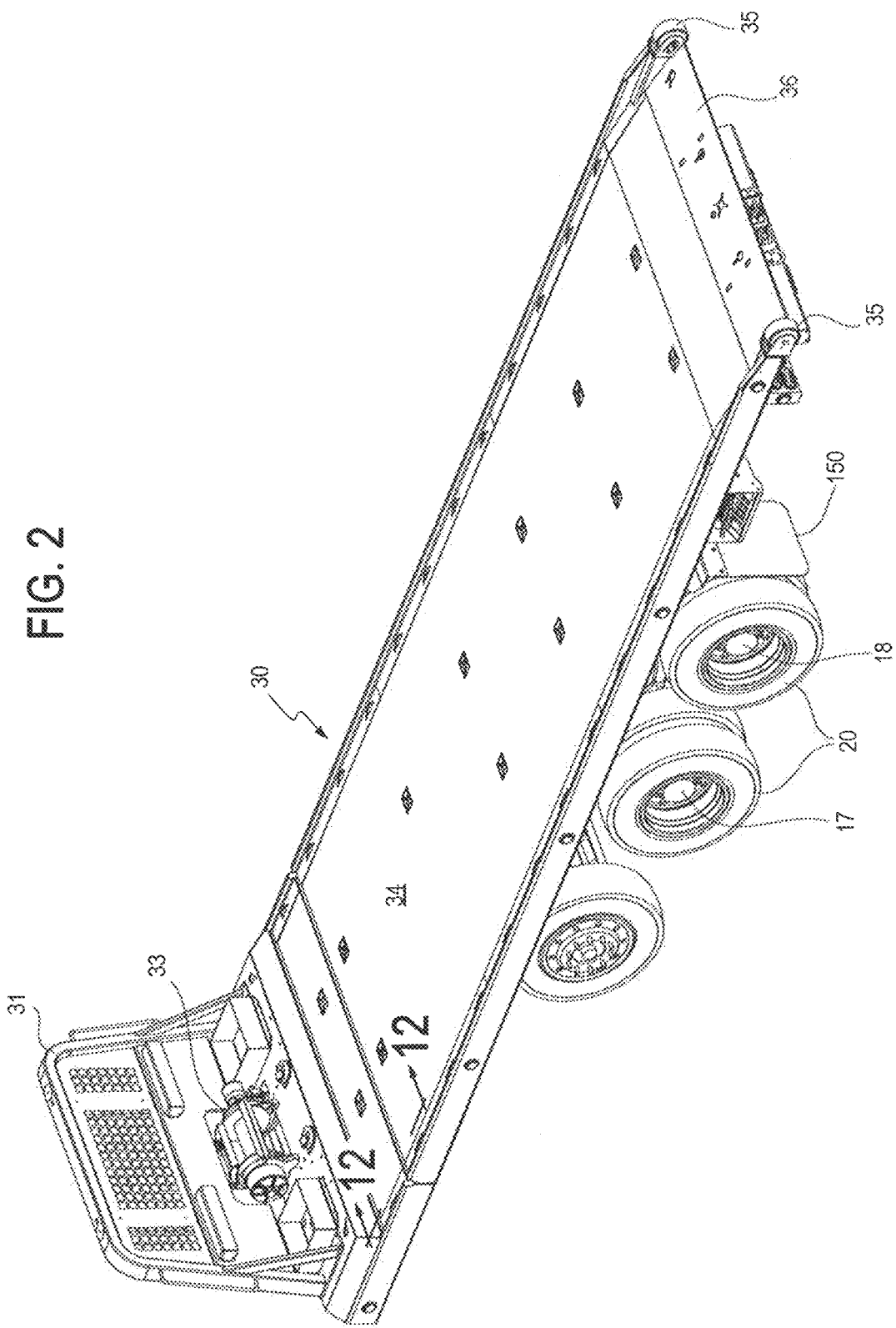
FIG. 2 is a top and side perspective view of the vehicle shown in FIG. 1.

The following parts list is provided for convenience in reading the following description of the preferred embodiment, in conjunction with the drawings. This parts list is not intended to limit the claimed invention in any way, as persons of ordinary skill will readily understand and appreciate that the claimed invention may be effectuated using different, additional or omitted parts.

REFERENCE NUMERAL DESCRIPTION 10 vehicle carrier
12 cab
13 subframe
13a longitudinal subframe rails
14 vehicle frame
16 vehicle front axle
17, 18 vehicle rear axles
19 vehicle lift axle
20 tires
22 recovered vehicle
30 bed
31 cab protector
32 C-shaped slide channels located on and beneath bed 30
32a rectangular tube slide rails located on & beneath rear bed portion 39
33 winch
34 bed platform
34a crossmembers for supporting bed platform
35 rear bed rollers
36 approach plate of platform
38 front bed portion
39 rear bed portion
40 hydraulic tilt cylinder
42 vehicle frame brackets
45 bed gussets
60 transverse bed hinges
70 drive axle (with key 74a)
70a hollow gear box shaft (with keyway 74 which interlocks with drive axle key 74a)
71, 72 (left and right) pinion gears
73 attachable collars
74 keyway
74a key
75 rear subframe hard stops
76 rear bed lock plates
77 front bed lock
81, 82 gear boxes
90 gear racks of subframe
90a supporting longitudinal rail for gear racks of subframe
95 subframe hinge
100 underlift
110 underlift outer boom
115 underlift inner boom
120 stabilizer bumper
130 hydraulic cylinder for underlift
140 carrier controls
150 mudflap

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 18:
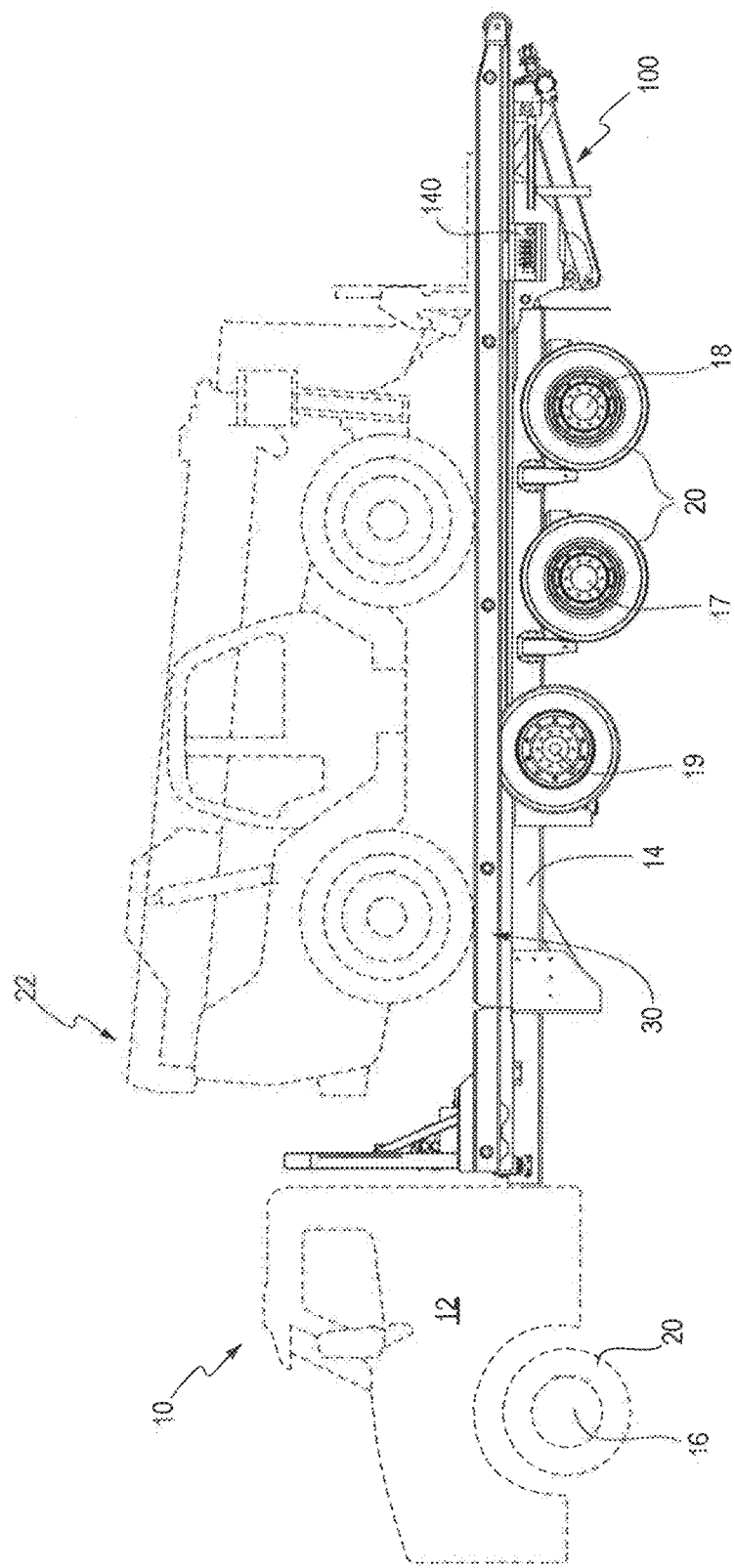
FIG. 18 is a side view of the carrier, with its cab, vehicle frame and a recovered vehicle on the bed, shown in dotted lines.

Referring generally first to FIGS. 1 and 18, a preferred vehicle carrier generally designated by the reference numeral 10 includes a cab 12, and a vehicle frame 14 supporting a subframe 13, which in turn supports a slidable bed 30. Subframe 13 pivots about subframe hinge 95 and includes subframe rails 13*a* slidably attached to bed rails 32 as described below. Hydraulic cylinders attached to the vehicle frame 14 may be extended to inclined subframe 13. Bed 30 may be slid up/forward and down/rearward relative to subframe 13, and is configured to support a vehicle 22 to be transported. Cab protector 31 may be located on a front-most portion of bed 30.

Figure 6:
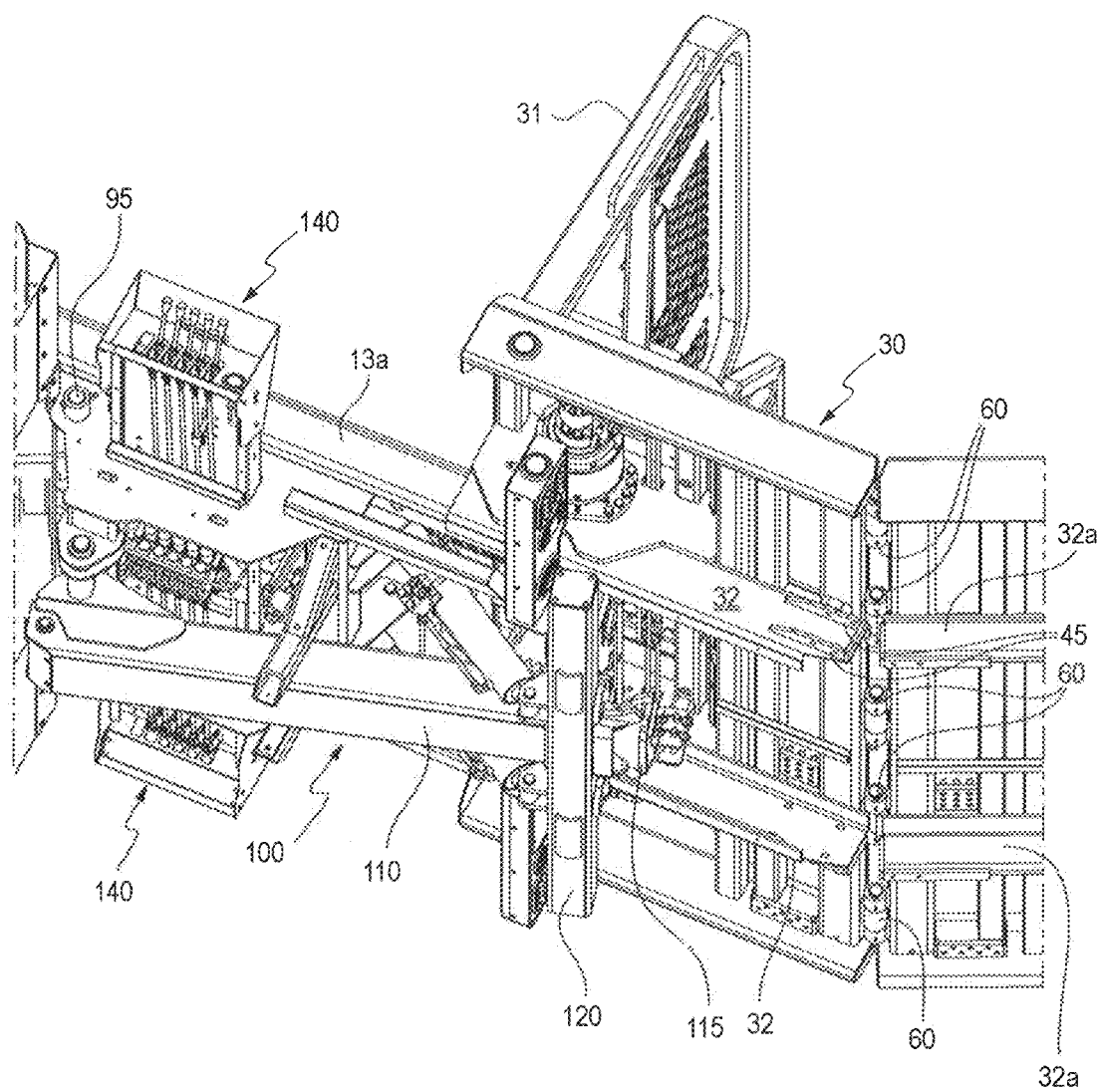
FIG. 6 is a partial, enlarged, side and bottom perspective view of a rear portion of the inclined subframe and a front portion of the hinged bed.
Figure 7:
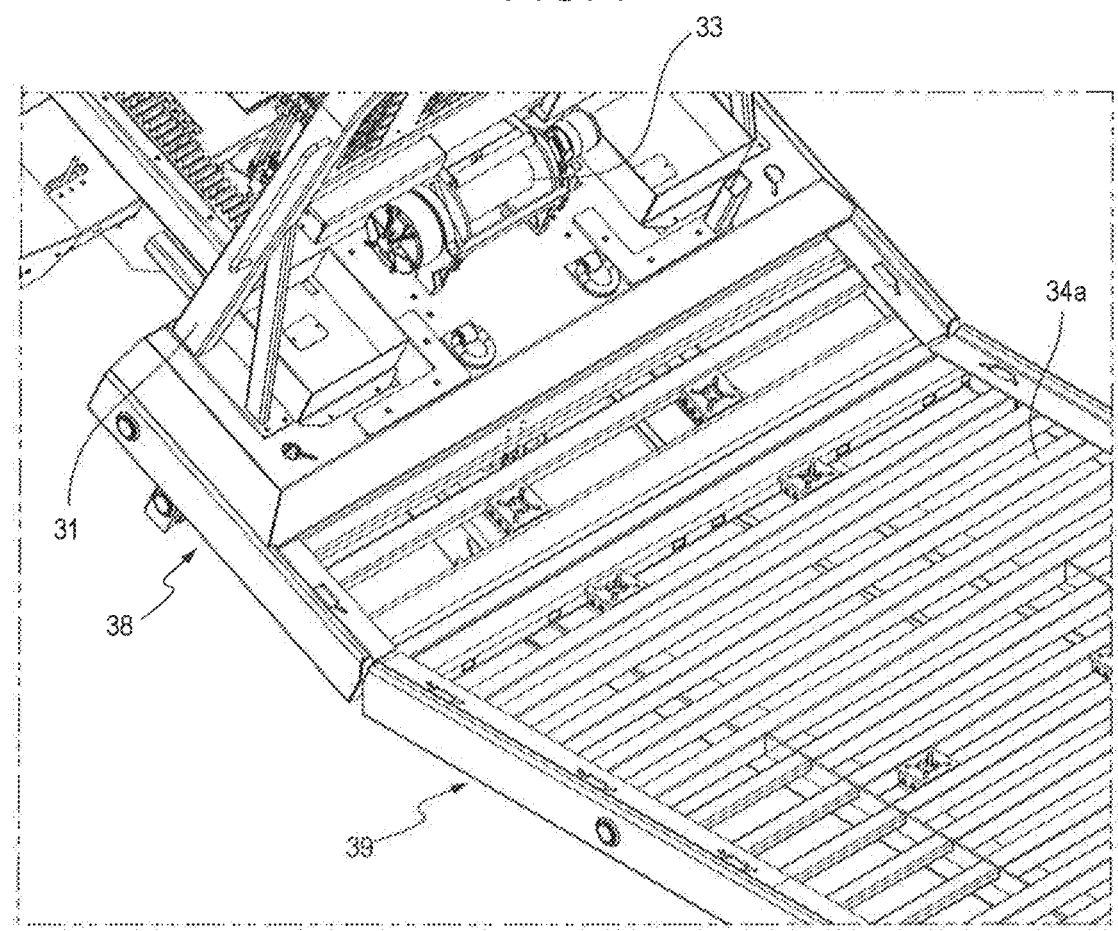
FIG. 7 is a partial, enlarged side and top perspective view of a front portion of the hinged bed.
Figure 11:
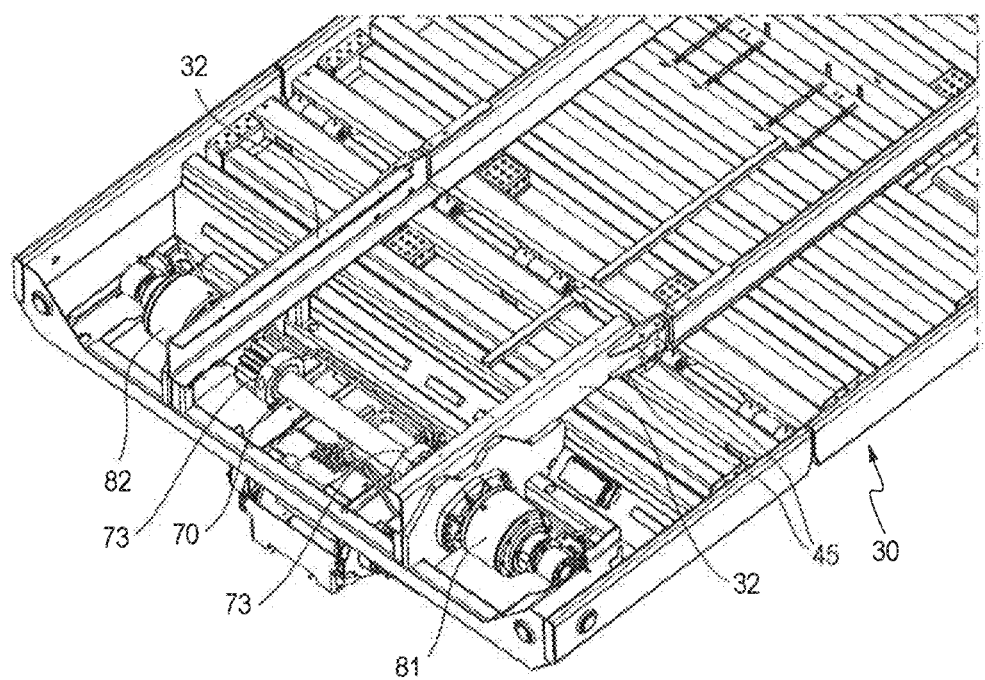
FIG. 11 is a partial, enlarged side and bottom view of a front portion of the bed.
Figure 12:
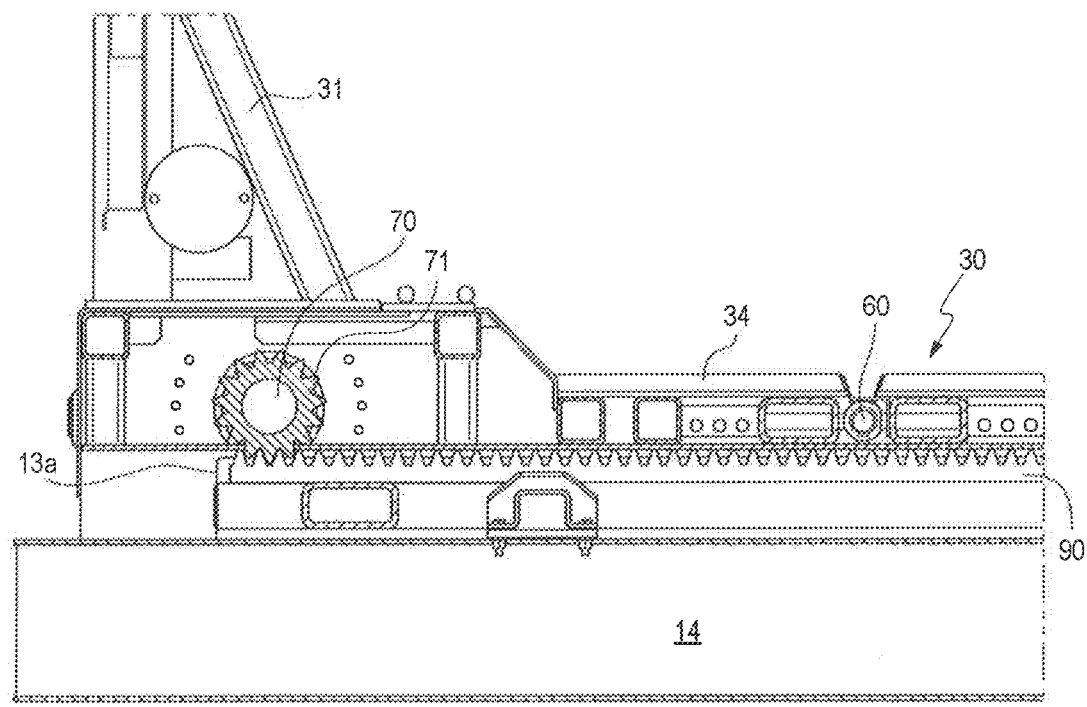
FIG. 12 is a side, partially-removed cross-sectional view of a front portion of the bed taken along reference line 12-12 of FIG. 2.
Figure 13:
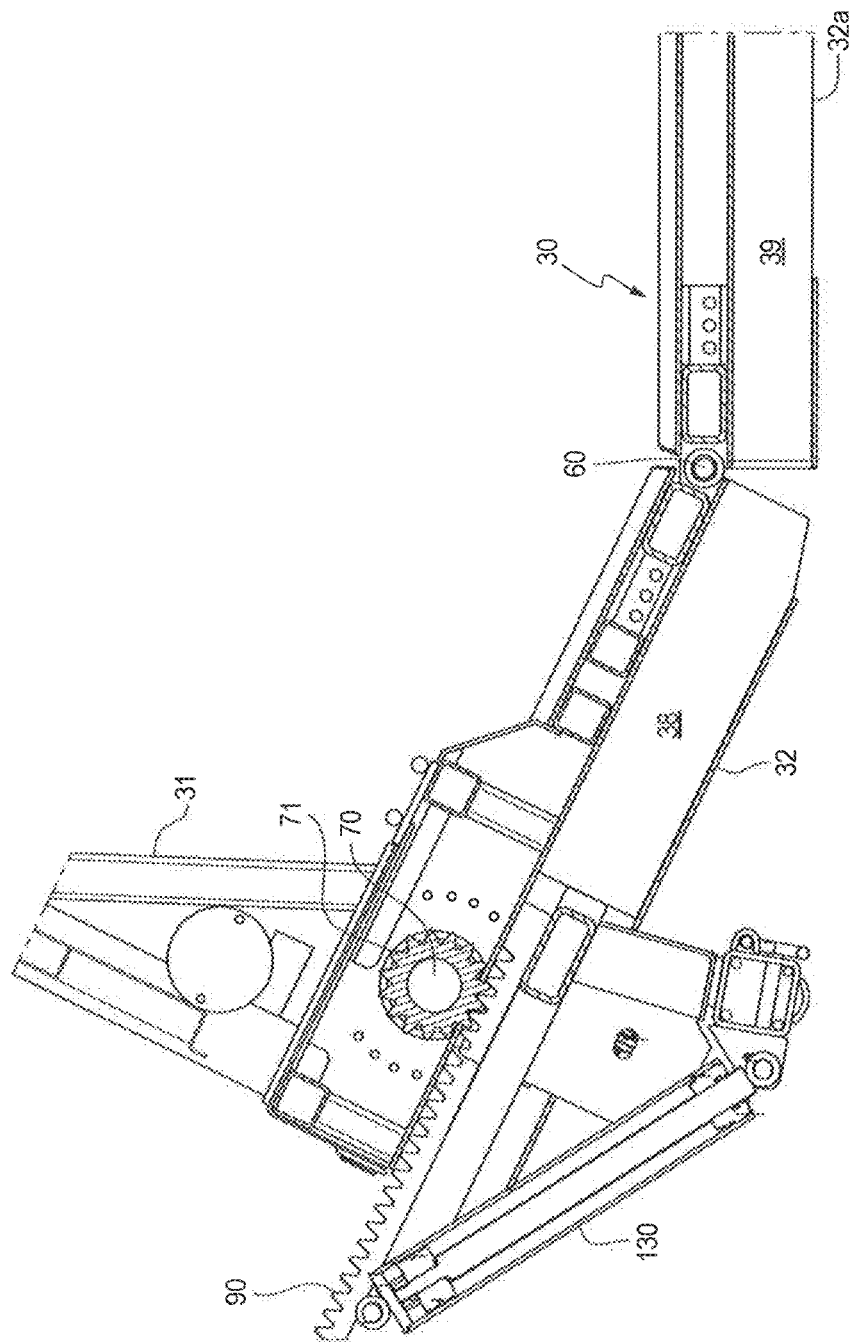
FIG. 13 is a view similar to FIG. 12 taken along reference line 13-13 of FIG. 4.
Figure 14:
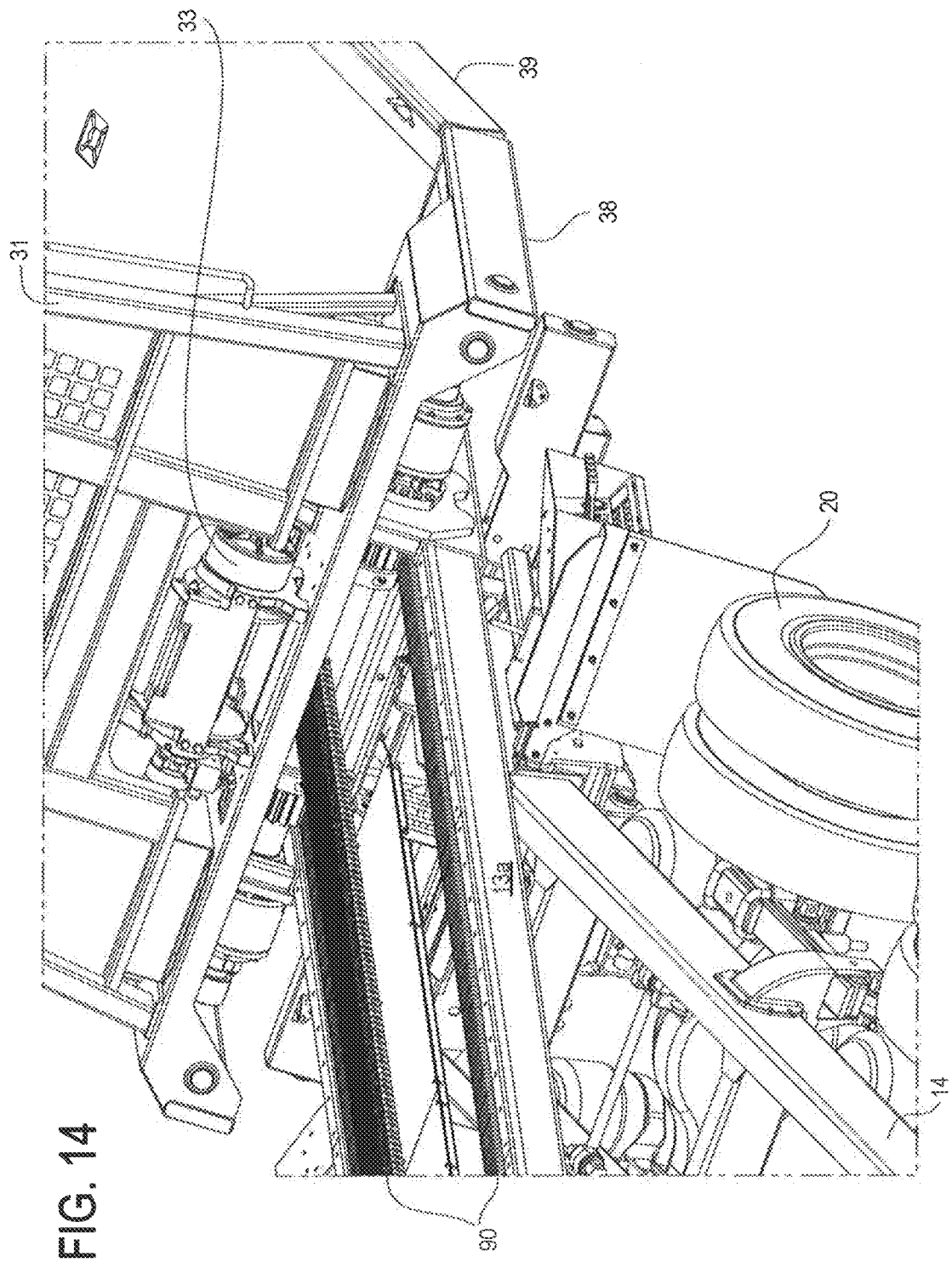
FIG. 14 is an enlarged, partial top and side perspective view of a rear portion of the subframe with the bed positioned fully rearward.

Referring to FIGS. 6, 11 and 14, front bed portion 38 may include a pair of generally C-shaped slide channels 32 that preferably surround the top surface, bottom surface, and outside vertical surface of subframe rails/slide tubes 13*a*. In this manner bed 30 remains slidably attached to subframe 13 during the bed's forward and rearward travel relative to subframe 13, as described below. Referring to FIGS. 6 and 11, bed brackets 45 may be used to provide rigidity when the channel-shaped slide rails 32 of front bed portion 38 meet against the tube-shaped slide rails 32*a* of rear bed portion 39, when the front bed portion and rear bed portion are parallel.

Figure 19:
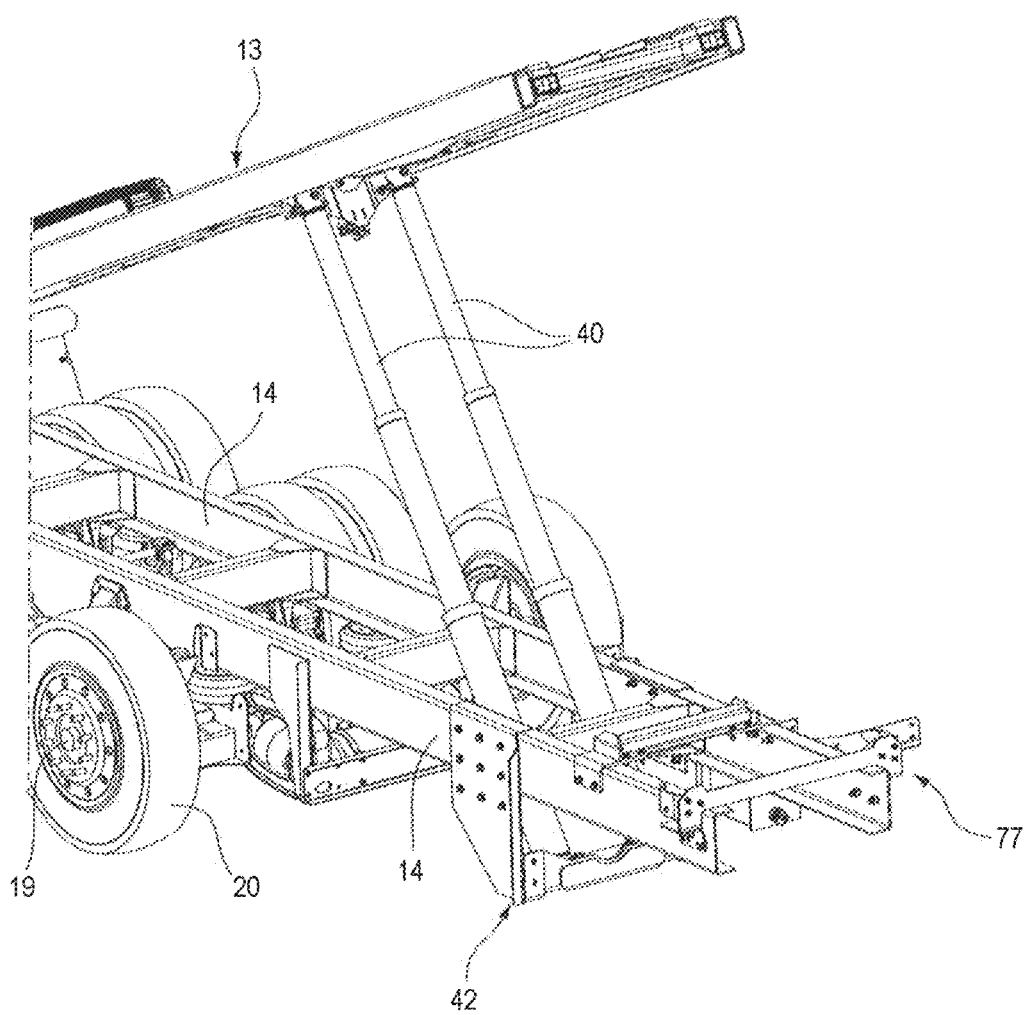
FIG. 19 is a partial, enlarged side and front perspective view of the vehicle frame with the subframe in an inclined position.

One or more, such as a pair, of hydraulic tilt cylinders 40 may be pivotally attached at an upper end to the subframe 13, and at a lower end to vehicle frame brackets 42 (see FIG. 19). Vehicle frame brackets 42 are preferably located between cab 12 of the vehicle 10, and rear axles 17, 18 of the vehicle. (Lift axle 19 can be lifted off the ground, or placed on the ground to handle heavy loads.)

Figure 3:
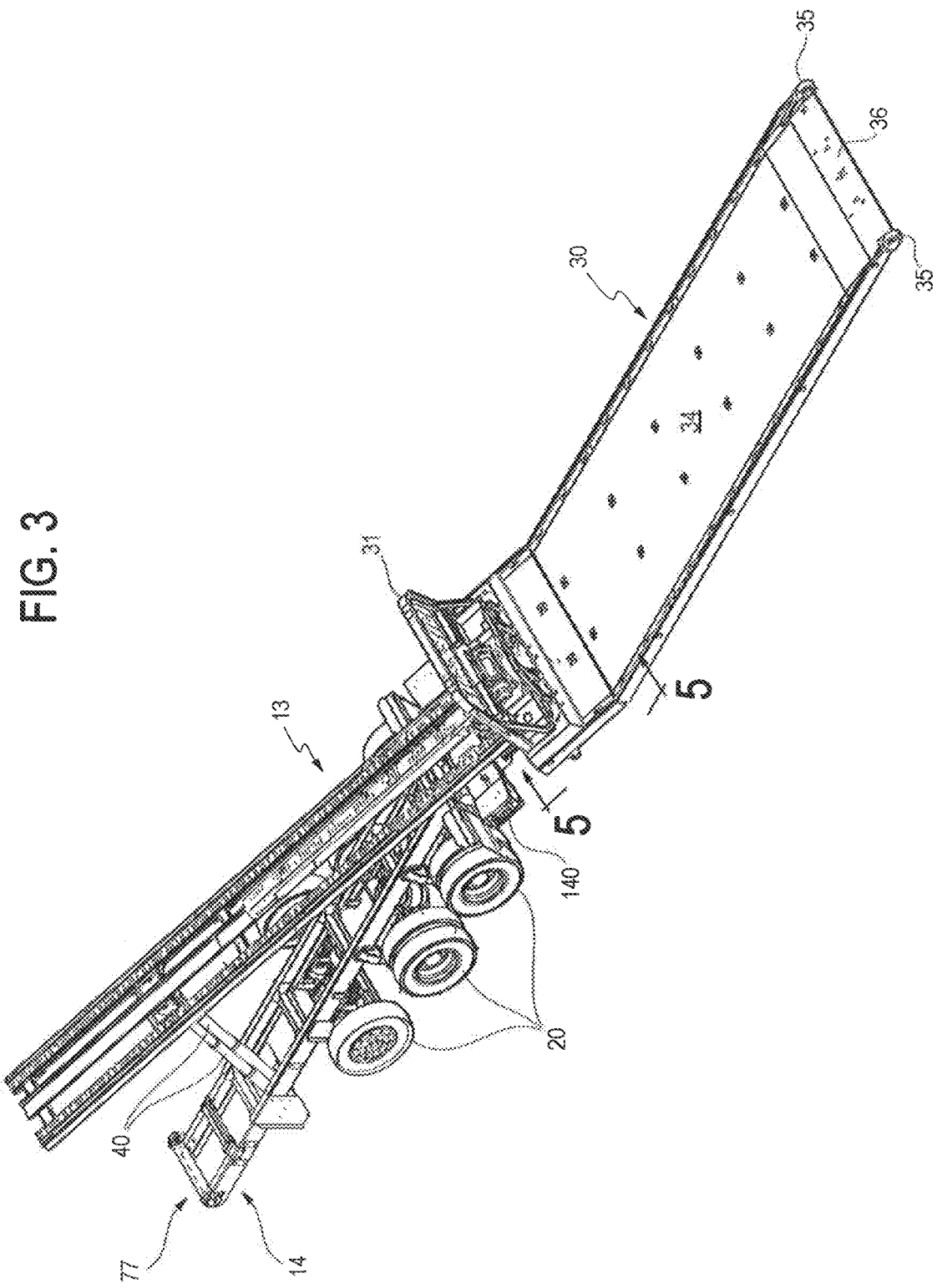
FIGS. 3 and 4 are top and side perspective views of the vehicle shown in FIG. 1, with the subframe raised to a fully inclined position, while the slidable bed is extended such that a "zero-degree load angle" is formed between the rear portion of the bed and the ground.
Figure 4:
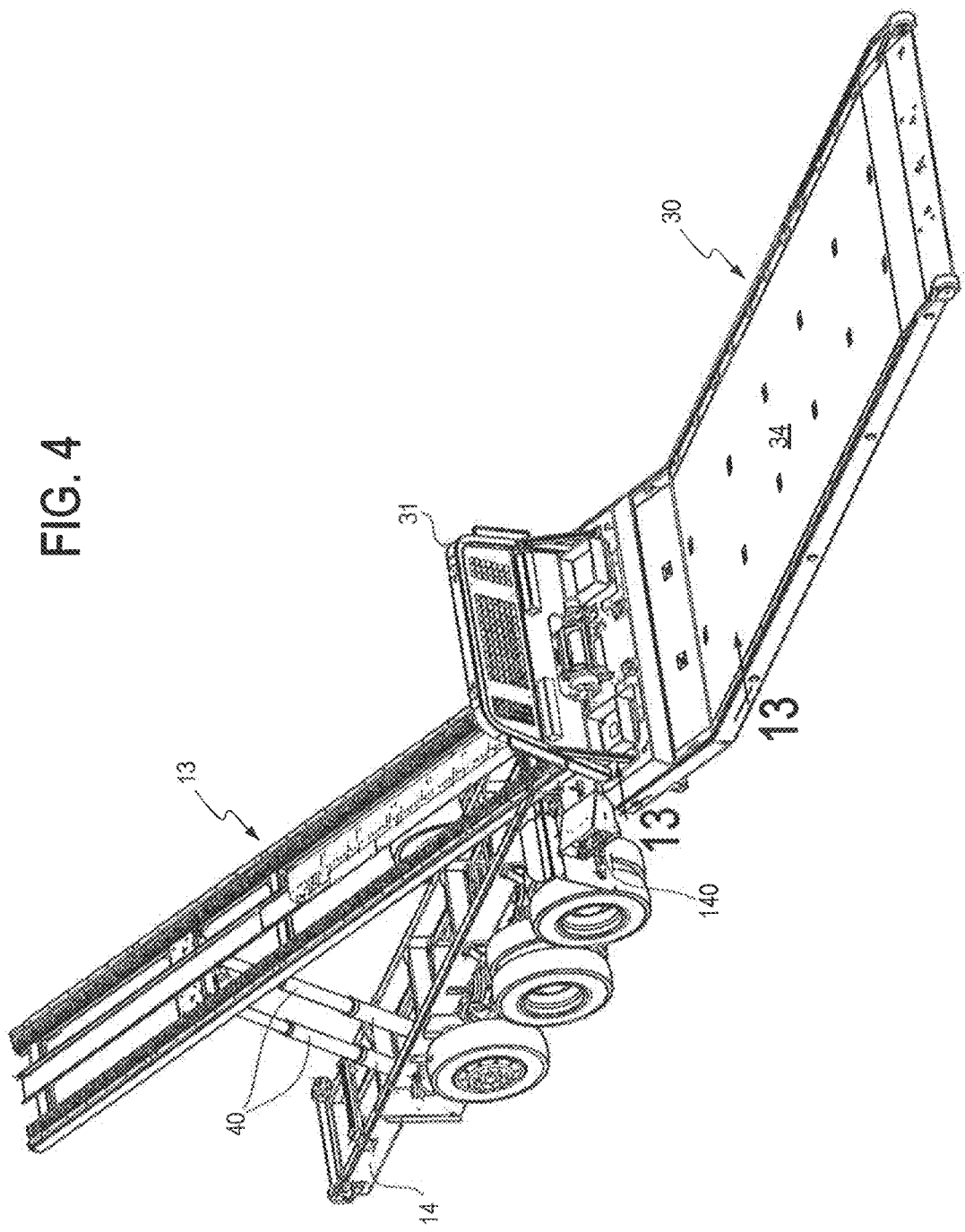
Figure 5:
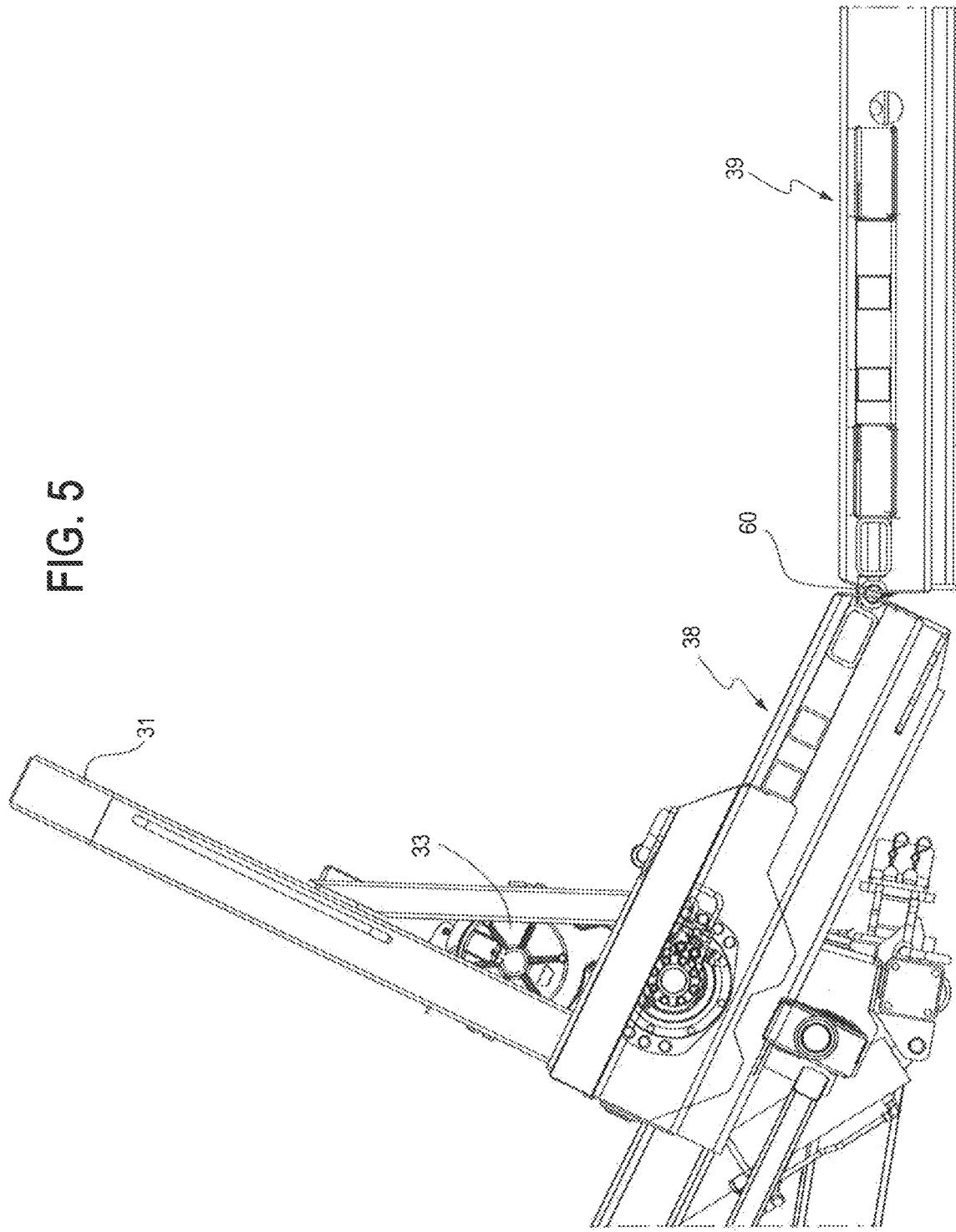
FIG. 5 is a partial, enlarged, side, partially removed, perspective view of a portion of the hinged bed, taken along reference line 5-5 of FIG. 3.
Figure 16:
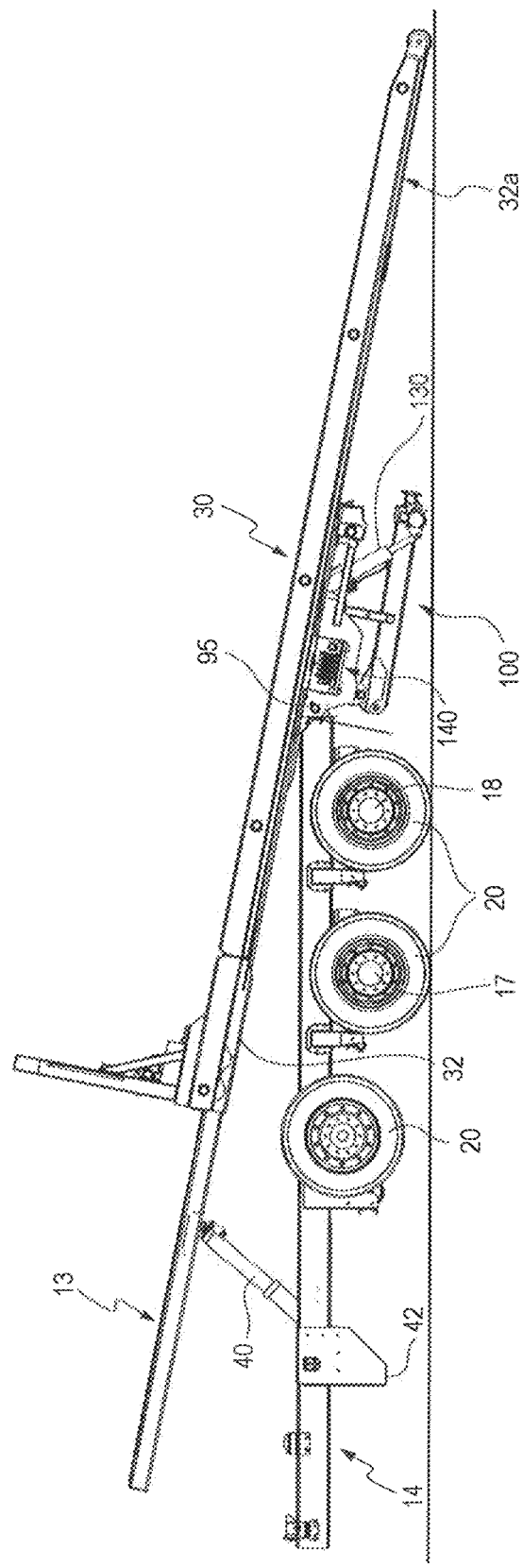
FIG. 16 is a side perspective view of the carrier of the present invention, with the subframe partially inclined, and the bed partially slid in a rearward direction relative to the subframe (as with a traditional slideback carrier)
Figure 17:
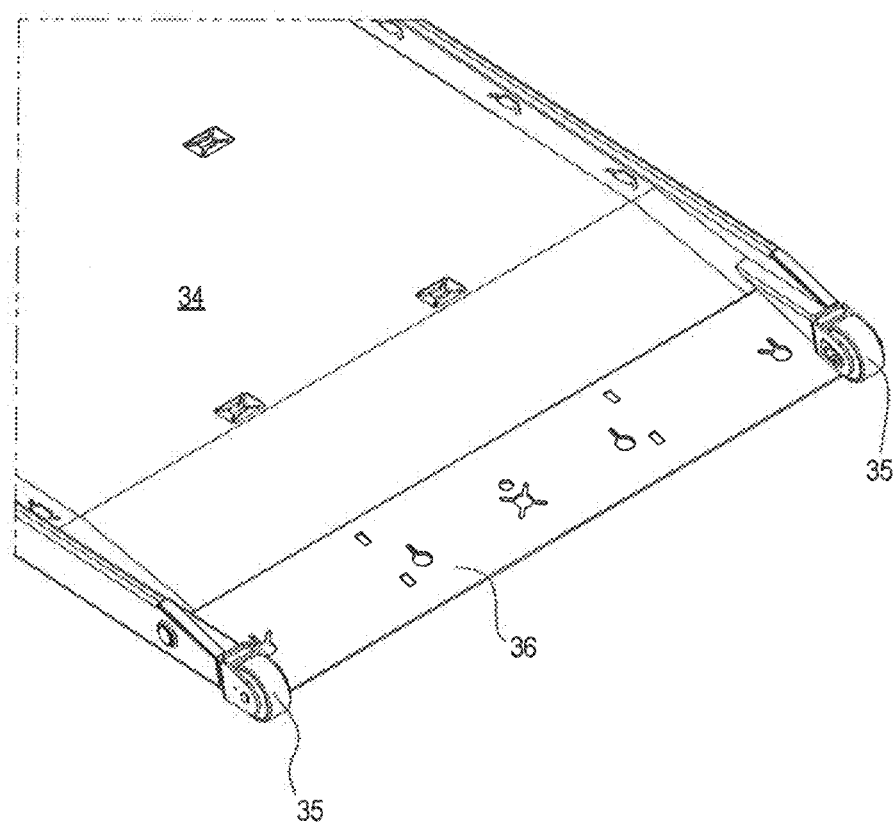
FIG. 17 is an enlarged, side and top perspective view of a rear portion of the bed, showing the approach plate of the platform.

Referring to FIGS. 3, 4 and 16, tilt cylinders 40 preferably are located forward of the rear truck axles. If there are 3 rear truck axles, the tilt cylinders will likely be required to utilize multiple stages, so that they are short enough retracted, and long enough extended, to achieve an approximate 25° tilt angle, as required so that the platform may have essentially a zero-degree load angle. In the preferred embodiment shown in FIGS. 3, 4 and 16, tilt cylinder 40's retracted length is approximately 52 inches, and its extended length is approximately 120 inches, while the bed length for an industrial carrier is 28-30 feet (bed width about 102 inches).

Figure 8:
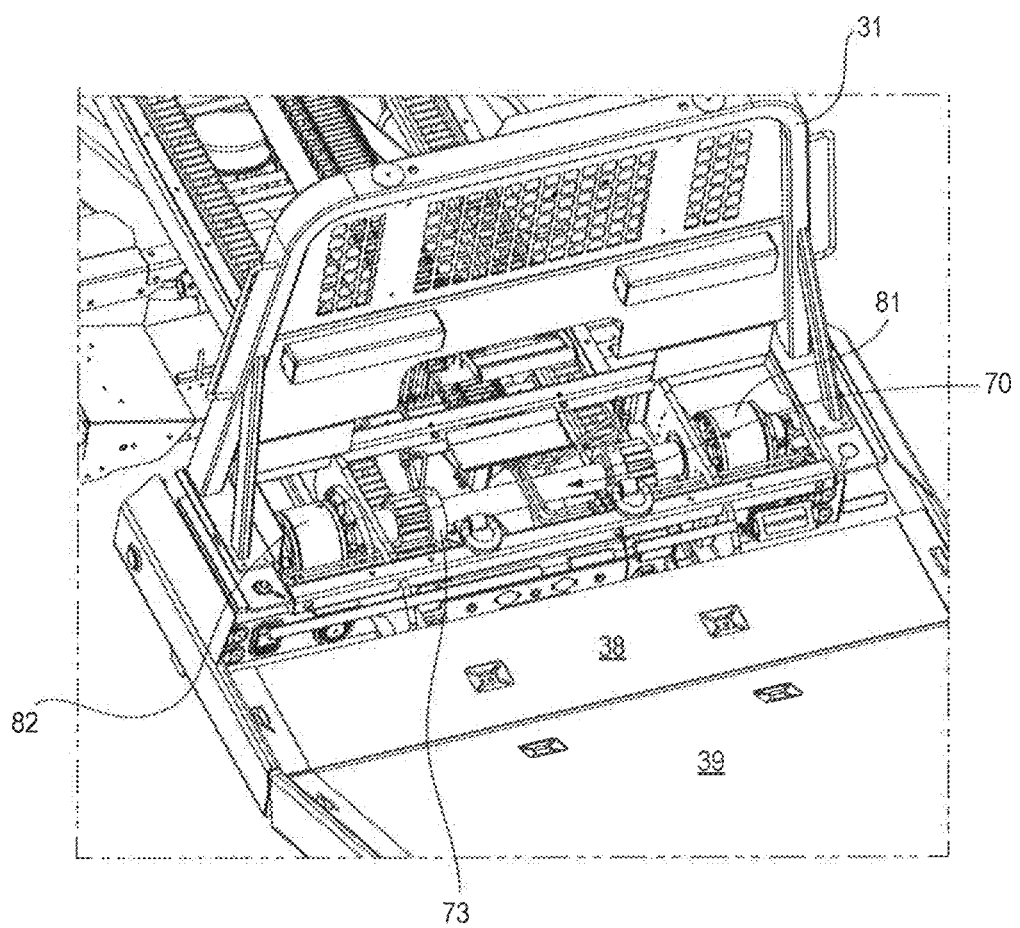
FIG. 8 is a view similar to FIG. 7, but from a further top angled perspective, with the floor plate of the frontmost portion of the bed hidden to allow viewing of components located underneath the bed.

Persons of ordinary skill in the art will appreciate that hydraulic power may be governed by a PTO, pump, oil tank, oil filter, directional control valve, and load holding counterbalance valves, as is conventional with vehicle carriers. The drive axle may be equipped with attachable collars 73 (FIGS. 8 and 11) configured to engage a hard stop 75 (FIG. 15) at the back end of the subframe so that the bed cannot be traveled off the subframe in a rearward direction.

Gear boxes 81, 82 may be equipped with internal brakes to prevent the bed from moving along the subframe in the absence of hydraulic power.

Figure 15:
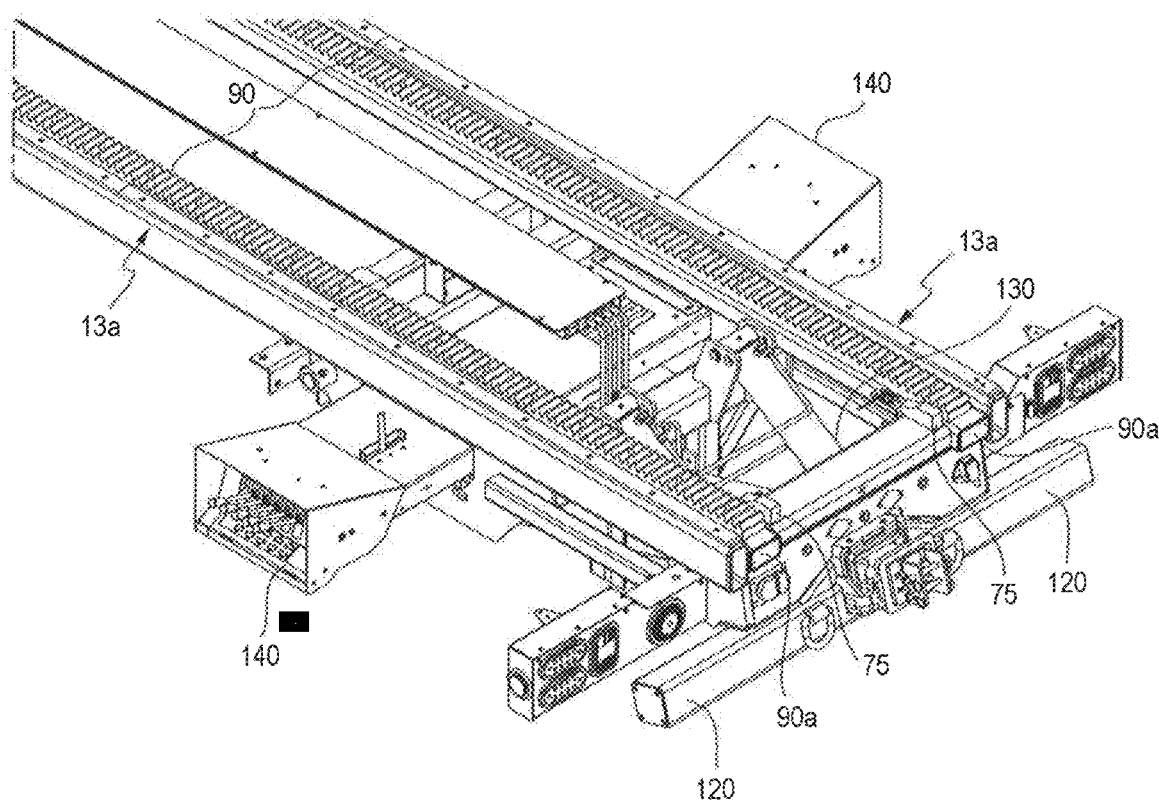
FIG. 15 is a partial side and top perspective view of a rear portion of the horizontal subframe.

Referring to FIG. 15, the rear end of the bed on the underside of the approach plate may be equipped with a pair of rear lock plates 76 (FIGS. 20-21) that may engage the back of the subframe, so that the rear portion of the bed will not bounce on the subframe while the truck is being driven. Referring to FIGS. 20-21, rear lock plates 76 also form a hard stop against the back of the subframe to limit the bed's forward travel.

The tilt cylinders are the primary means of hold-down for pulling and clamping the subframe against the truck frame to prevent bouncing when driving the truck. Front bed lock 77 is the secondary means to hold the bed down in the event of dynamic flex between tilt cylinders 40 and the back of the cab. When engaged, the sides and lower flange of slide channels 32 are bound by front bed lock 77.

Preferably, the rear edge 36 of platform 34, located on rear bed portion 39, includes rear rollers 35 to facilitate bed travel. Also, the rear portion of the bed preferably utilizes slide rails 32*a* that are tubes instead of channels so that the rear portion of the bed can angularly separate from the longitudinal subframe rails as rear rollers 35 travel along the ground.

Referring to FIG. 6, a front portion of the bed preferably includes one or more transverse hinges 60, such as a series of hinges 60 as shown. (Five sets of hinges, axially aligned, are shown in FIG. 6; hinges segmented in this fashion are more easily serviceable compared to a continuous hinge.)

Figure 9:
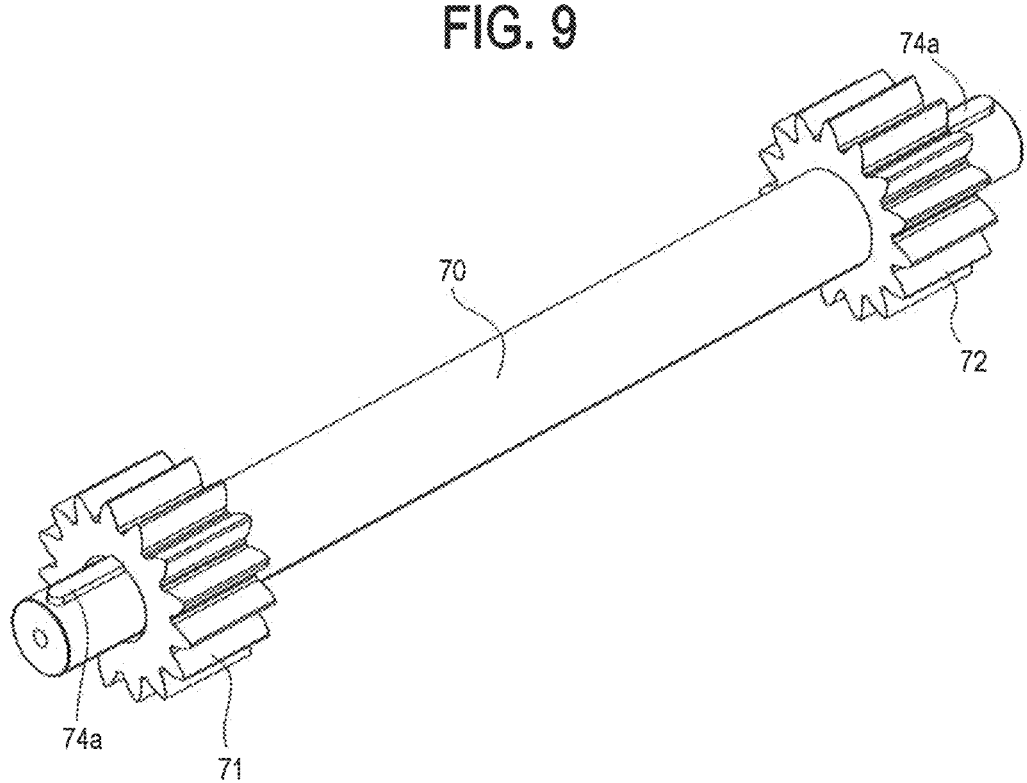
FIG. 9 is a perspective view of a preferred drive axle.
Figure 10:
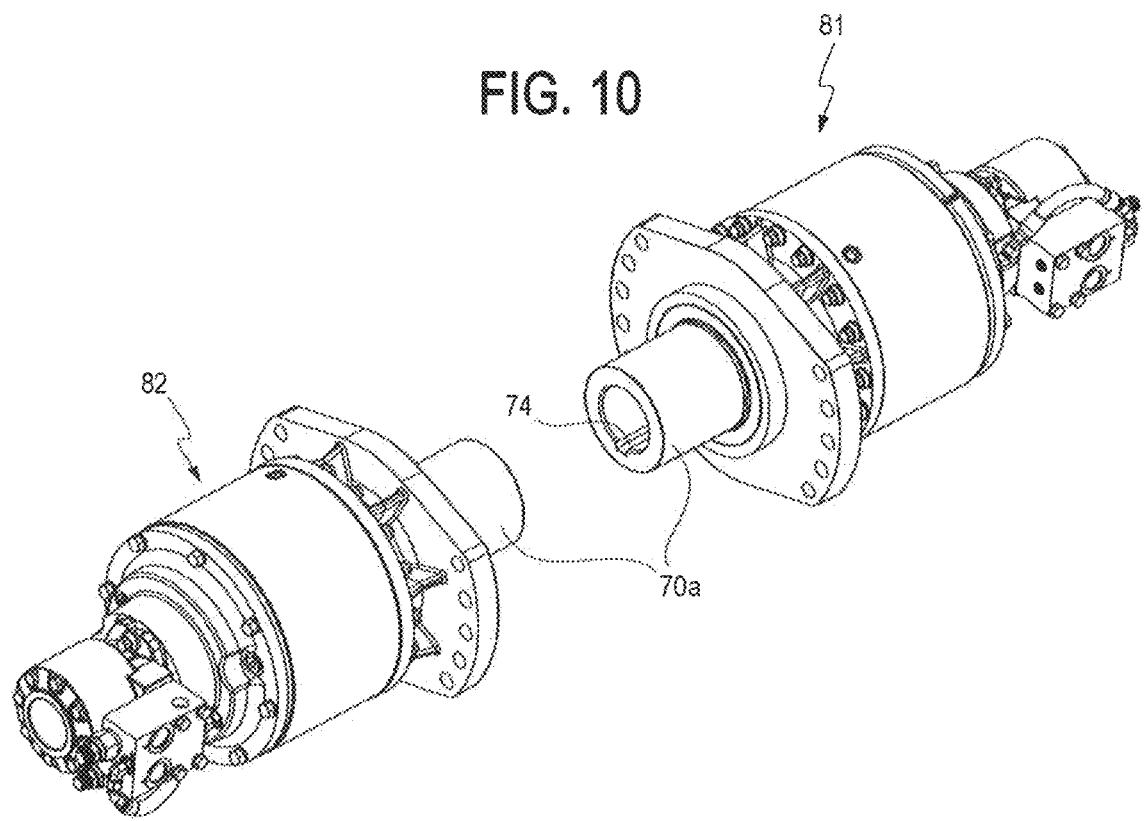
FIG. 10 is a perspective view of preferred left and right motor-driven gear boxes.

Referring to FIG. 9, keys 74*a* on drive axle 70 line up with and engage corresponding keyways 74*a* (FIG. 10) in hollow shaft 70*a* of gear boxes 81, 82. This key to keyway engagement allows the gear boxes to turn the drive axle when the drive axle is inserted into the gear boxes.

Movement of the bed relative to the subframe will now be described. In the preferred embodiment, subframe 13 includes longitudinal gear racks 90 located inboard of and parallel to slide rails 13*a* of the subframe. Front bed portion 38 carries a pair of symmetrically-aligned, motor-driven gear boxes 81, 82 (see FIGS. 8, 10) which are axially aligned with and coupled to drive axle 70 which includes pinion gears 71, 72. Drive axle 70 is oriented axially parallel to transverse bed hinges 60. Hydraulic pressure applied to gear boxes 81, 82 drives gears 71, 72 of drive axle 70, engaging longitudinal gear racks 90 of the subframe, and causing the bed to move forward and rearward relative to the subframe.

The load angle of the bed is zero when the bed is laid flat on level ground. Given the geometry disclosed above, the load angle or dump angle can be set anywhere between 0 and 25 degrees. Although a high load angle is usually not desirable, a high dump angle is useful for unloading cargo that does not roll or slide easily like bundled wood or bundled steel for example. The carrier of the present invention can be used like a typical carrier, but with an improved load angle of anywhere between about 0 and 11 degrees. Use of such a load angle may be desirable in situations where 65-feet of footprint space is not available to lay the bed flat on the ground. The lower the bed can be placed to the ground, the easier it is to step on and step off the bed for securing the payload, and the less chance for accidental injury to an operator getting on and off the bed.

A detailed description of the preferred sequence of operations of the preferred embodiment of the vehicle carrier of the present invention is now explained. First, the bed may be slid back (i.e., in a rearward direction away from the cab) 12-24 inches along the subframe, in order to clear front bed lock 77 (shown in FIGS. 1 and 3). Next, cylinders 40 may be extended and the subframe may be tilted 12-15° until the front of the bed is approximately cab height. Now, cylinder 130 may be extended such that stabilizer bumper 120 touches the ground to support the weight of the bed as the bed extends. Next, the bed may be slid rearwardly until hinge 60 is aligned with subframe hinge point 95. (The operator should not allow the downward force from the weight of front bed portion 38 to be applied to the subframe behind subframe hinge point 95 at this point of the operation.) Next, cylinder 130 may be retracted so that boom 110 is fully elevated and stabilizer bumper 120 is in the air. The front of the bed should now be supported by the subframe forward of hinge 95. (The back of the bed is supported by the ground.) Now, cylinders 40 may be extended again until stabilizer bumper 120 again touches the ground. At this point, the bed may be slid rearwardly until it lays flat on the ground. Now a load (e.g., vehicle to be transported) may be placed on the bed, and secured. Once the load is secured, the bed may be slid forward until hinge 60 is aligned with or slightly forward of subframe hinge 95. (The downward force of the bed on the subframe should be completely forward of subframe hinge 95 before the next operation is performed.) Next, cylinders 40 may be retracted and the subframe lowered until the front of the subframe is approximately cab height. Now, cylinder 130 may be extended so that stabilizer bumper 120 touches the ground, thereby stabilizing the weight transfer of the rear bed portion 39 onto the subframe during the next operation. At this point, the bed may be slid forward, ensuring that the stabilizer remains on the ground as the rearward edge of the bed leaves the ground. The bed is slid forward along the subframe until about 18-24 inches remains between the forward edge of the bed, and the forward edge of the subframe. Now, cylinders 40 may be further retracted, until the bed and subframe are fully lowered and supported by the vehicle frame. At this juncture, the bed should be slid forward into front bed lock 77. Finally, stabilizer bumper 120 should be raised off the ground to the stowed position.

The above description is not intended to limit the meaning of the words used in the following claims that define the invention. Persons of ordinary skill in the art will understand that a variety of other designs still falling within the scope of the following claims may be envisioned and used. It is contemplated that these additional examples, as well as future modifications in structure, function, or result to that disclosed here, will exist that are not substantial changes to what is claimed here, and that all such insubstantial changes in what is claimed are intended to be covered by the claims.

I claim:

1. A vehicle carrier mountable to a vehicle frame, comprising:
    a tillable subframe pivotally attached to a rear end of the vehicle frame, the subframe comprising at least two parallel, longitudinal slide rails;
    a slidable bed mounted on the subframe, the bed comprising at least two parallel channels each located and sized to slidably attach to a longitudinal slide rail of the subframe, wherein the bed also comprises a transverse hinge dividing the bed into a relatively short front portion and a relatively long rear portion, and wherein the relatively long rear portion comprises at least a majority of an overall length of the bed; and
    a drive system enabling the bed to slide back and forth along the longitudinal slide rails of the subframe;
    wherein the subframe is capable of tilting to a sufficient inclination relative to ground to enable the relatively long rear portion of the bed to lay generally horizontally flat along the ground, while the relatively short front portion of the bed remains slidably attached to the inclined subframe.

2. The vehicle carrier of claim 1, wherein the carrier permits a substantially zero-degree loading angle for a vehicle to be transported, while the front portion of the bed remains slidably attached to the inclined subframe.

3. The vehicle carrier of claim 1., further comprising one or more hydraulic tilt cylinders pivotally attached at an upper end to the subframe, and at a lower end to vehicle frame brackets, enabling the subframe to be tilted relative to ground, and wherein the vehicle frame brackets are located between a cab of a vehicle, and rear axles of the vehicle.

4. The vehicle carrier of claim 1, Wherein the rear portion of the bed includes rear rollers.

5. The vehicle carrier of claim 1, wherein the subframe comprises longitudinal gear racks located inboard of and parallel to the slide rails of the subframe.

6. The vehicle carrier of claim 5, wherein the front portion of the bed carries a pair of symmetrically-aligned, motor-driven gear boxes axially aligned and coupled to a drive axle, and wherein the drive axle is oriented axially parallel to the transverse hinge of the bed.

7. The vehicle carrier of claim 6, wherein the drive axle comprises a pair of gears engaging the longitudinal gear racks of the subframe to cause the bed to move forward and rearward relative to the subframe.

8. The vehicle carrier of claim 6, wherein hydraulic pressure applied to the motor-driven gear boxes causes the bed to travel longitudinally along the subframe.

9. A method for using a vehicle carrier mountable to a vehicle frame, comprising the steps of:
    providing a tillable subframe pivotally attached to a rear end of the vehicle frame, the subframe comprising two parallel, longitudinal slide rails;
    providing a bed having a transverse hinge mounted on and slidably attached to the subframe, the tranverse hinge thereby dividing the bed into a relatively short front portion and a relatively long rear portion, wherein the relatively long rear portion comprises at least a majority of an overall length of the bed;
    providing a drive system enabling the bed to slide back and forth along the longitudinal slide rails of the subframe; and
    moving the bed in a rearward direction relative to the subframe, and tilting the subframe to a sufficient inclination relative to ground to enable the rear portion of the bed to lay generally horizontally flat along the ground, while the front portion of the bed remains slidably attached to the inclined subframe.

10. The method of claim 9. wherein the vehicle carrier further comprises longitudinal gear racks located inboard of and parallel to the slide rails.

11. The method. of claim 9, wherein the step of tilting the subframe includes the step of providing a substantially zero-degree loading angle for the transported vehicle.

12. The method of claim 9, wherein the bed comprises two parallel channels each located and sized to slidably attach to one of a pair of longitudinal slide rails of the subframe.

13. The method of claim 9, wherein the transverse hinge of the bed divides the bed into a relatively short front portion and a relatively long rear portion.

14. The method of claim 9, further comprising the step of loading the transported vehicle on the vehicle carrier by moving the bed in a forward direction relative to the subframe, and tilting the subframe to bring the bed to a position generally parallel to ground, while the front portion of the bed remains slidably attached to the subframe.

* * * * *

UNITED STATES PATENT AND TRADEMARK OFFICE
CERTIFICATE OF CORRECTION

| | |
|---|---|
| PATENT NO. | : 11,247,600 B2 |
| APPLICATION NO. | : 17/037947 |
| DATED | : February 15, 2022 |
| INVENTOR(S) | : Ronald B. Nespor |

Page 1 of 1

It is certified that error appears in the above-identified patent and that said Letters Patent is hereby corrected as shown below:

In the Claims

Claim No. 1, Column 7, Line 41, "tillable" should be deleted and "tiltable" substituted therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*